US012269724B2

(12) United States Patent
Yao

(10) Patent No.: US 12,269,724 B2
(45) Date of Patent: Apr. 8, 2025

(54) MASON JAR SEALING DEVICE

(71) Applicant: Shanghai Xinqi Electronic Technology Co., Ltd., Shanghai (CN)

(72) Inventor: Guodong Yao, Jiangxi (CN)

(73) Assignee: Shanghai Xinqi Electronic Technology Co., Ltd., Shanghai (CN)

( * ) Notice: Subject to any disclaimer, the term of this patent is extended or adjusted under 35 U.S.C. 154(b) by 0 days.

(21) Appl. No.: 18/749,671

(22) Filed: Jun. 21, 2024

(65) Prior Publication Data

US 2024/0336468 A1 Oct. 10, 2024

Related U.S. Application Data

(63) Continuation-in-part of application No. 18/624,165, filed on Apr. 2, 2024, which is a continuation of application No. 17/944,828, filed on Sep. 14, 2022, now Pat. No. 11,981,555, application No. 18/749,671 is a continuation-in-part of application No. 18/518,664, filed on Nov. 24, 2023, now Pat. No. 12,060,179, which is a continuation-in-part of application No. 17/944,828, filed on Sep. 14, 2022, now Pat. No. 11,981,555.

(30) Foreign Application Priority Data

| | | |
|---|---|---|
| Sep. 6, 2022 | (CN) | 202211085654.X |
| Nov. 16, 2023 | (CN) | 202330751533.3 |
| May 31, 2024 | (CN) | 202421238948.6 |

(51) Int. Cl.
*B65D 81/20* (2006.01)
*B67B 3/24* (2006.01)

(52) U.S. Cl.
CPC .................................... *B67B 3/24* (2013.01)

(58) Field of Classification Search
CPC ...... B65B 31/025; B65D 81/2038; B67B 3/24
See application file for complete search history.

(56) References Cited

U.S. PATENT DOCUMENTS 2,436,849 A * 3/1948 Billetter .................... B67B 3/24 53/103
4,372,096 A * 2/1983 Baum ....................... B67B 3/24 53/103
5,651,470 A * 7/1997 Wu .......................... F16J 13/24 220/240
5,944,212 A * 8/1999 Chang ................ B65D 81/2038 220/DIG. 16

(Continued)

*Primary Examiner* — Andrew M Tecco

(57) ABSTRACT

A Mason jar sealing device includes: a mounting shell, a connection assembly, and an air pumping-inputting assembly. The mounting shell or the connection assembly defines an air inlet. An end of the connection assembly is connected to the mounting shell, and the other end of the connection assembly is connected to the Mason jar body. When in use, a sealing cavity is formed between the connection assembly and the Mason jar body, and the opening of the Mason jar body is located in the sealing cavity. The air pumping-inputting assembly is mounted on the mounting shell, the air pumping-inputting assembly is communicated with the air inlet and the sealing cavity, the air pumping-inputting assembly is configured to extract air out of the Mason jar body to enable the jar lid to seal to the Mason jar body.

20 Claims, 12 Drawing Sheets

(56) References Cited

U.S. PATENT DOCUMENTS

| | | | | | |
|---|---|---|---|---|---|
| 5,957,317 | A * | 9/1999 | Lee | B65D 81/2038 220/240 |
| 6,662,831 | B2 * | 12/2003 | Chen | F04B 41/02 53/210 |
| 7,048,136 | B2 * | 5/2006 | Havens | B65D 51/1644 222/509 |
| 7,721,771 | B2 * | 5/2010 | Tsay | B01J 3/006 141/83 |
| 9,359,121 | B1 * | 6/2016 | Hsieh | B65D 81/2038 |
| 11,117,791 | B2 * | 9/2021 | Alipour | B67B 3/24 |
| 11,352,179 | B2 * | 6/2022 | Cabouli | G07C 9/00912 |
| 11,780,664 | B2 * | 10/2023 | Cabouli | G07C 9/00309 206/524.8 |
| 2018/0251355 | A1 * | 9/2018 | Alipour | B67B 7/20 |
| 2019/0367233 | A1 * | 12/2019 | Cabouli | B65D 55/14 |

* cited by examiner

MASON JAR SEALING DEVICE

CROSS REFERENCE TO RELATED APPLICATIONS

The present application is a continuation-in-part application of: the U.S. patent application Ser. No. 18/624,165, filed on Apr. 2, 2024; and the U.S. patent application Ser. No. 18/518,664, filed on Nov. 24, 2023. The present application further claims the priority of the Chinese patent application No. 202421238948.6, filed on May 31, 2024, and contents of which are incorporated herein by its entireties.

TECHNICAL FIELD

The present disclosure relates to the field of Mason jars, and in particular to a Mason jar sealing device.

BACKGROUND

A Mason jar is a glass jar configured with a threaded iron lid. The Mason jar has a high sealing performance and is used to store dry food or to pickle food. An air extraction device and an air intake device may be used to seal the Mason jar.

The air intake device in the art is generally a solenoid valve. The solenoid valve inputs the air to connection between the sealing device and the Mason jar, such that the Mason jar is separated from the sealing device after being sealed. However, since the solenoid valve itself cannot withstand a negative pressure. Therefore, the solenoid valve may leak under the negative pressure, and a valve core of the solenoid valve may get stuck at an opening state and a closed state, resulting in the solenoid valve being unable to operate.

SUMMARY OF THE DISCLOSURE

The present disclosure provides a Mason jar sealing device, configured to seal a jar lid to an opening of a Mason jar body. The Mason jar sealing device includes: a mounting shell, a connection assembly, and an air pumping-inputting assembly. The mounting shell or the connection assembly defines an air inlet. An end of the connection assembly is connected to the mounting shell, and the other end of the connection assembly is configured to be connected to the Mason jar body; when in use, a sealing cavity is formed between the connection assembly and the Mason jar body, and the opening of the Mason jar body is located in the sealing cavity. The air pumping-inputting assembly is mounted on the mounting shell, the air pumping-inputting assembly is communicated with the air inlet and the sealing cavity, the air pumping-inputting assembly is configured to extract air out of the Mason jar body to enable the jar lid to seal to the Mason jar body and to selectively open or close the air inlet.

BRIEF DESCRIPTION OF THE DRAWINGS

In order to more clearly illustrate the technical solutions in the embodiments the present disclosure or in the art, the accompanying drawings for describing of the embodiments of the present disclosure or in the art will be briefly introduced in the following. Obviously, the accompanying drawings in the following description show only some of the embodiments of the present disclosure. Any ordinary skilled person in the art may obtain other drawings based on the following accompanying drawings without creative work.

Figure 1:
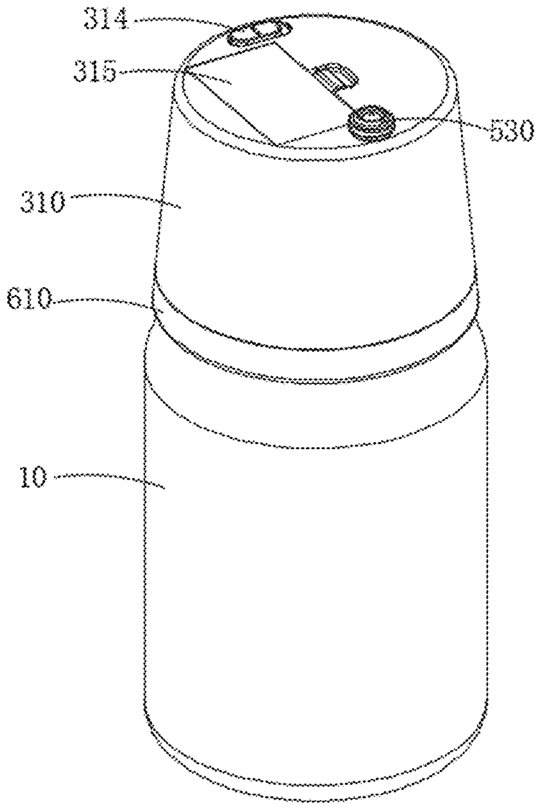
FIG. 1 is a perspective view of a Mason jar sealing device according to an embodiment 1 of the present disclosure.

Reference numerals in the drawings: Mason jar 10, jar lid 20, mounting shell 30, mounting cover 310, first end wall 311, battery compartment 313, control switch 314, compartment lid 315, mounting tab 316, positioning protrusion 317, receiving cavity 318, first side wall 312, partition plate 320, vent hole 321, air delivery tube 322, connection protrusion 323, positioning slot 3231, counterbore hole 3232, snap-in slot 324, insertion portion 3241, snapping portion 3242, mounting hole 325, sealing block 326, receiving slot 327, air inlet 40, air inlet tube 41, slit 43, air pumping-inputting assembly 50, vacuum pump 510, three-way connector 520, first hole 521, second hole 522, third hole 523, sealing member 530, flexible air tube 540, connection assembly 60, connection shell 610, second end wall 611, second side wall 612, airflow hole 613, snapping protrusion 614, threaded hole 615, first sealing loop 620, sealing ring 630, second sealing loop 640, third sealing loop 650, sealing chamber 70, first chamber 710, second chamber 720, abutting portion 730.

DETAILED DESCRIPTION

Unless otherwise defined, all technical and scientific terms used herein have the same meaning as commonly understood by any ordinary skilled person in the art. The terms used herein in the specification of the present disclosure are used only for the purpose of describing specific embodiments and are not intended to limit the present disclosure. The terms "include", "have" and any variations thereof, used in the specification and claims of the present disclosure are intended to cover non-exclusive inclusion. The terms "first", "second", and so on, in the specification, claims, and drawings of the present disclosure are used to distinguish different objects and are not used to describe a particular order.

Reference to "embodiment" herein implies that particular features, structures, or properties described in an embodiment may be included in at least one embodiment of the present disclosure. The presence of the term at various sections in the specification does not necessarily refer to a same embodiment, nor a separate or an alternative embodiment that is mutually exclusive of other embodiments. Any ordinary skilled person in the art shall understand, explicitly and implicitly, that the embodiments described herein may be combined with other embodiments.

In order to enable any ordinary skilled person in the art to better understand the present disclosure, technical solutions in the embodiments of the present disclosure will be clearly and completely described below by referring to the accompanying drawings.

As shown in FIGS. 1-16, the present disclosure provides a Mason jar sealing device configured to seal a jar lid 20 to a jar opening of a Mason jar body 10. The Mason jar sealing device includes a mounting shell 30, a connection assembly 60, and an air pumping-inputting assembly 50. The mounting shell 30 or the connection assembly 60 defines an air inlet 40. An end of the connection assembly 60 is connected to the mounting shell 30, and the other end is connected to the Mason jar body 10. When in use, a sealing cavity 70 is defined between the connection assembly 60 and the Mason jar body 10. The opening of the Mason jar body 10 is located in the sealing cavity 70. The air pumping-inputting assembly 50 is mounted on the mounting shell 30. The air pumping-inputting assembly 50 is communicated with the air inlet 40 and the sealing cavity 70. The air pumping-inputting assembly 50 is configured to extract air in the Mason jar body 10 to enable the jar lid 20 to seal to the opening of the Mason jar body 10, such that the air inlet 40 is selectively opened or closed.

Specifically, the mounting shell 30 includes a mounting cover 310 and a partition plate 320. The mounting cover 310 has a receiving cavity 318 having an opening on a side. The partition plate 320 covers the opening of the receiving cavity 318. The partition plate 320 is connected to the connection assembly 60. The partition plate 320 defines a vent hole 321. The vent hole 321 is communicated with the sealing cavity 70. A slit 43 is defined between the partition plate 320 and the mounting cover 310. The receiving cavity 318 is communicated to an outside of the Mason jar through the slit 43. The air pumping-inputting assembly 50 is received in the receiving cavity 318 and is communicated with the air inlet 40 and the vent hole 321.

The mounting shell 30 separated into the mounting cover 310 and the partition plate 320, i.e., the mounting cover 310 and the partition plate 320 are two independent structures, enabling the mounting shell 30 to be modular. This configuration enables the air pumping-inputting assembly 50 to be mounted, disassembled and maintained more simply and easily.

Figure 2:
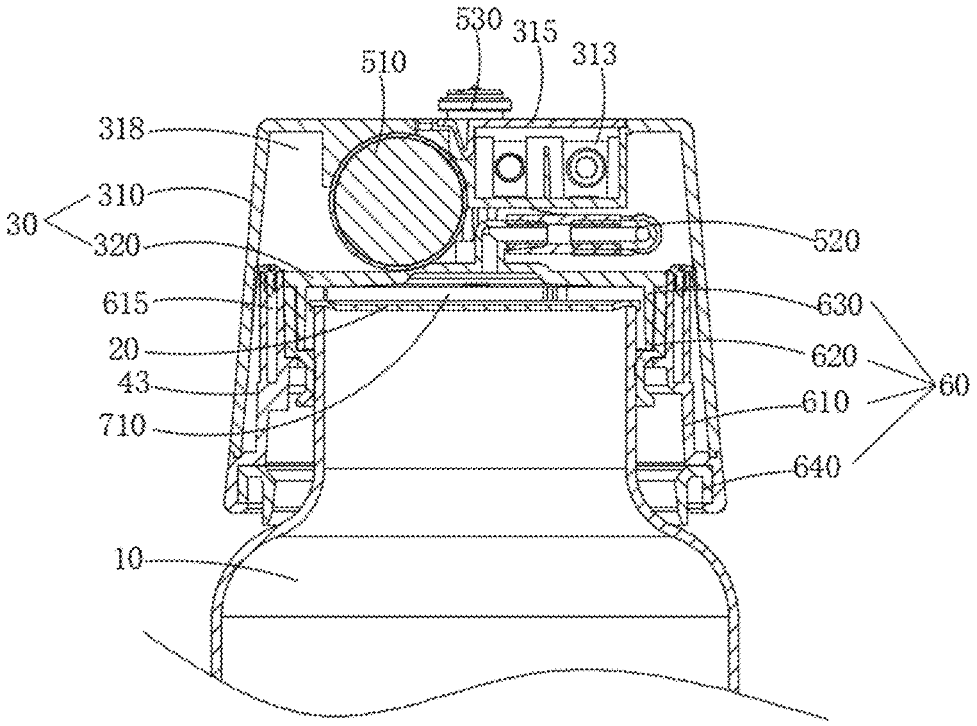
FIG. 2 is a cross-sectional view of a portion of the Mason jar sealing device shown in FIG. 1.
Figure 3:
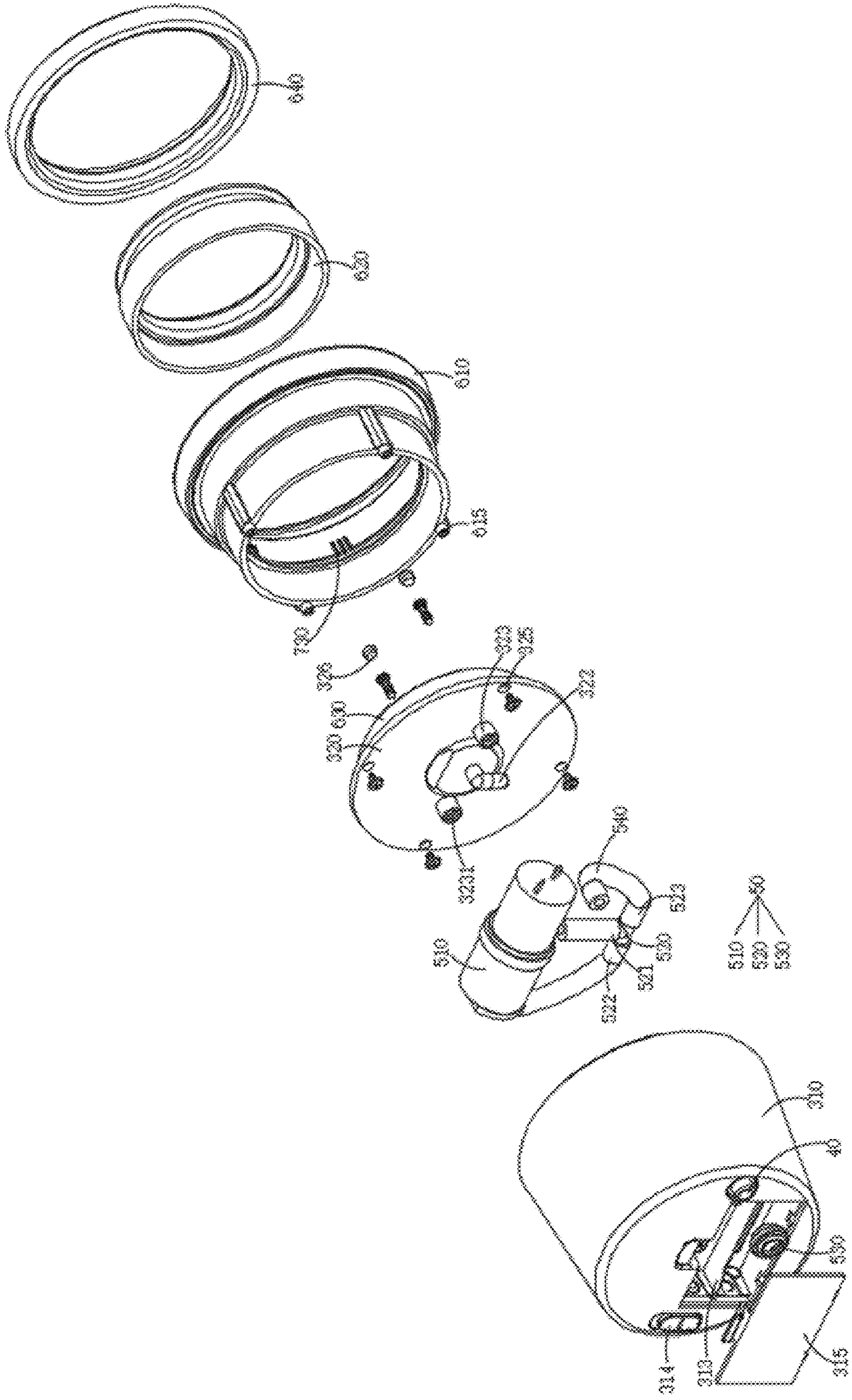
FIG. 3 is an exploded view of the Mason jar sealing device according to the embodiment 1 of the present disclosure.
Figure 4:
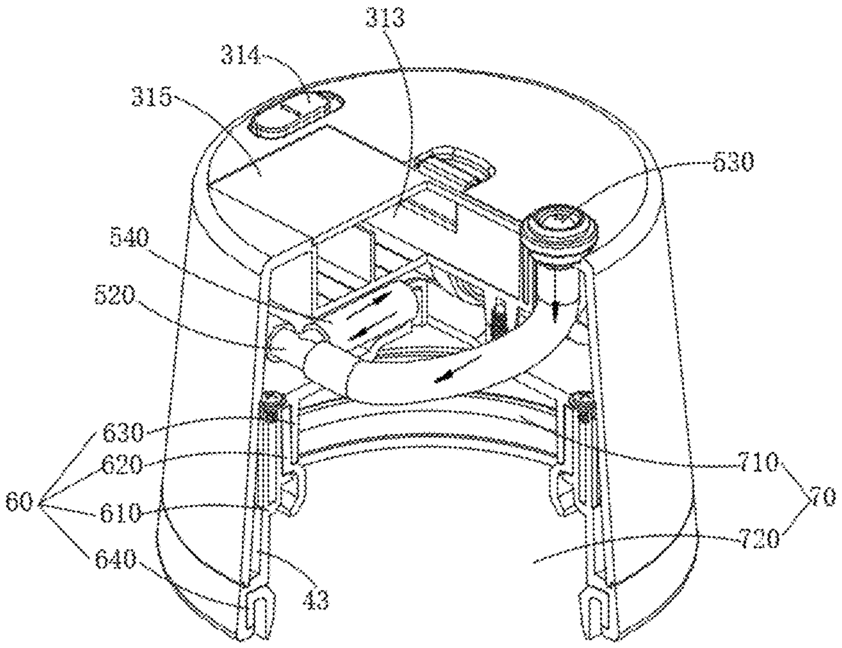
FIG. 4 is a cross-sectional view of partial components of the Mason jar sealing device according to the embodiment 1 of the present disclosure.

As shown in FIGS. 2-4, the air pumping-inputting assembly 50 includes a vacuum pump 510, a three-way connector 520, and a sealing member 530. The vacuum pump 510 is mounted in the receiving cavity 318. The vacuum pump 510 is communicated to the outside of the Mason jar through the slit 43. The three-way connector 520 is mounted in the receiving cavity 318. The three-way connector 520 includes a first hole 521, a second hole 522, and a third hole 523, where the first hole 521, the second hole 522, and the third hole 523 are communicated with each other. The first holes 521 is communicated to the vent hole 321, the second hole 522 is communicated to the vacuum pump 510, and the third hole 523 is communicated to the air inlet 40. The sealing member 530 is mounted at the air inlet 40 and is configured to seal or open the air inlet 40.

Specifically, the first hole 521 is communicated to the vent hole 321 through a flexible air tube 540. The second hole 522 is communicated to the vacuum pump 510 through the flexible air tube 540. The third hole 523 is communicated to the air inlet 40 through the flexible air tube 540. Airtightness of connection between the vent hole 321, the air inlet 40, the vacuum pump 510 and the three-way connector 520 is ensured by the flexible air tube 540. In addition, in order to facilitate the communication between the vent hole 321 and the flexible air tube 540, the partition plate 320 further includes an air delivery tube 322 that is communicated to the vent hole 321. The air delivery tube 322 is communicated to the first hole 521 through the flexible air tube 540.

According to the above configuration, when the Mason jar body 10 is to be sealed, firstly, the sealing member 530 seals the air inlet 40, and subsequently, the jar lid 20 is placed at the opening of the Mason jar body 10. Furthermore, the Mason jar body 10 is extended into the connection assembly 60. At this moment, the sealing cavity 70 is formed by the partition plate 320, the connection assembly 60, and the Mason jar body 10. Subsequently, the vacuum pump 510 is activated, and the air in the sealing cavity 70 and the Mason jar body 10 is pumped out. The air flows through the first hole 521, the second hole 522 and the vacuum pump 510 successively to reach the receiving cavity 318. The air inside the receiving cavity 318 is discharged to the outside of the Mason jar body 10 through the slit 43 between the mounting cover 310 and the end of the partition plate 320, enabling an air pressure inside the receiving cavity 318 to be balanced with the atmospheric pressure, facilitating the vacuum pump 510 to operate cyclically. When the air in the sealing cavity 70 is extracted, the air pressure in the sealing cavity 70 decreases, and the atmospheric pressure presses the Mason jar body 10 in the sealing cavity 70. In this way, the Mason jar body 10 is sealed to the connection assembly 60. When the air in the Mason jar body 10 is extracted, the air is extracted through the gap between the jar lid 20 and the opening of the Mason jar body. The negative pressure inside the Mason jar body 10 increases, and the jar lid 20 is attached, due to the pressure, to the opening of the Mason jar body. In this way, the jar lid 20 seals the opening of the Mason jar body 10, and after sealing, the vacuum pump 510 is switched off.

As shown in FIG. 4, when the Mason jar body 10 is to be unsealed from the connection assembly 60, the sealing member 530 is separated from the air inlet 40. The air from the outside of the Mason jar flows into the sealing cavity 70 by flowing through the air inlet tube 41, the third hole 523, the first hole 521, and the vent hole 321 successively. In this way, the pressure inside the sealing cavity 70 is balanced with the atmospheric pressure, and connection between the connection assembly 60 to the Mason jar body 10 is released. By separating the sealing member 530 from the air inlet 40, the air is inputted into the sealing cavity 70.

Therefore, the technical problems that the solenoid valve may have leakage or damage when being used to input the air into the jar body, may be solved. The configuration herein is simple, the sealing operation can be performed conveniently, a cost thereof is reduced, and the sealing performance is reliable.

Figure 5:
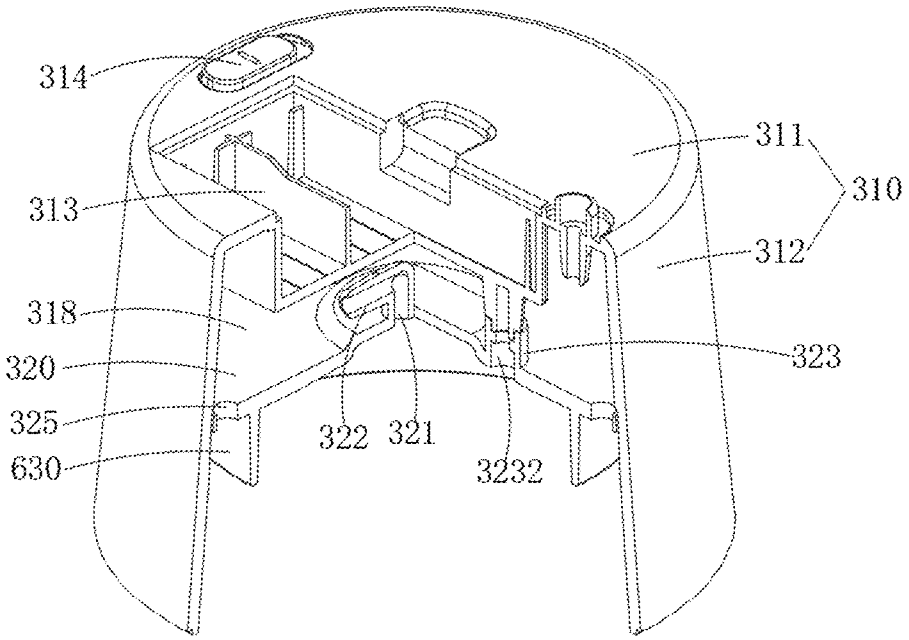
FIG. 5 is a cross-sectional view of a mounting cover and a partition plate of the Mason jar sealing device according to the embodiment 1 of the present disclosure.

As shown in FIGS. 4 and 5, in the present embodiment, in order to facilitate the sealing member 530 to seal or open the air inlet 40, the mounting cover 310 is arranged with the air inlet tube 41. The air inlet tube 41 is communicated with the air inlet 40 and is communicated with the third hole 523 through the flexible air tube 540. Connection between the sealing member 530 and the air inlet tube 41 may be achieved by elastic sealing or metal sealing. When the elastic sealing is configured, the sealing member 530 is a rubber block. The rubber block is inserted in the air inlet tube 41 to seal the air inlet tube 41. When the metal sealing is configured, the sealing member 530 is a metal block arranged with threads. The metal block is embedded with a sealing loop. The metal block is threaded to the air inlet tube 41. In the present embodiment, the elastic rubber sealing is configured.

As shown in FIG. 5, the mounting cover 310 includes a first end wall 311 and a first side wall 312 that is extending downwardly from the first end wall 311. The first end wall 311 and the first side wall 312 cooperatively form the receiving cavity 318 having an opening facing away from the first end wall 311. The partition plate 320 is connected to the first end wall 311 and is disposed opposite to the first end wall 311. The air inlet 40 is defined in the first end wall 311. The configuration allows the air inlet 40 to be located on a top surface of the mounting cover 310, facilitating the user to perform operations on the sealing member 530 to separate the sealing member 530 from the air inlet 40.

Figure 8:
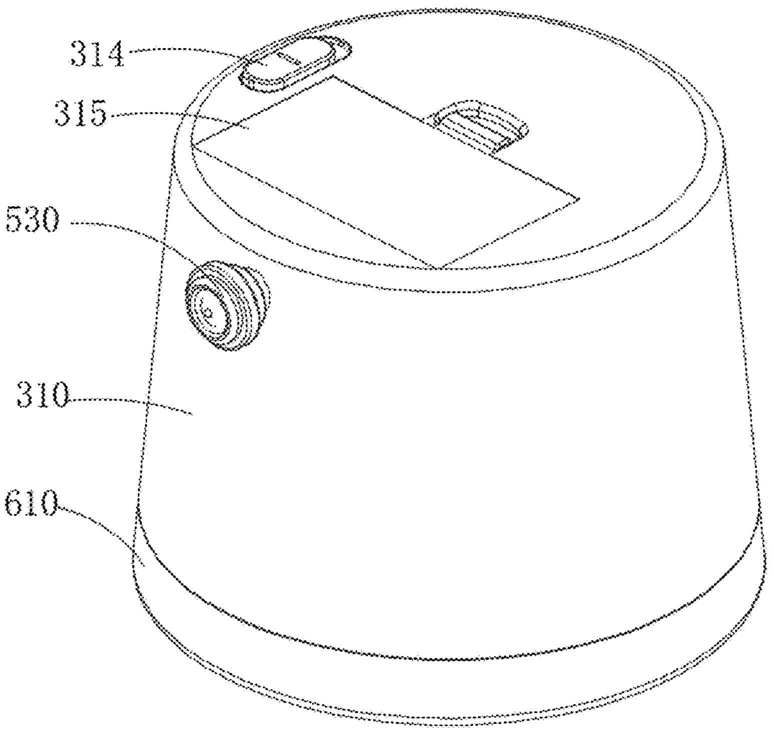
FIG. 8 is another perspective view of a Mason jar sealing device according to an embodiment 1 of the present disclosure.
Figure 9:
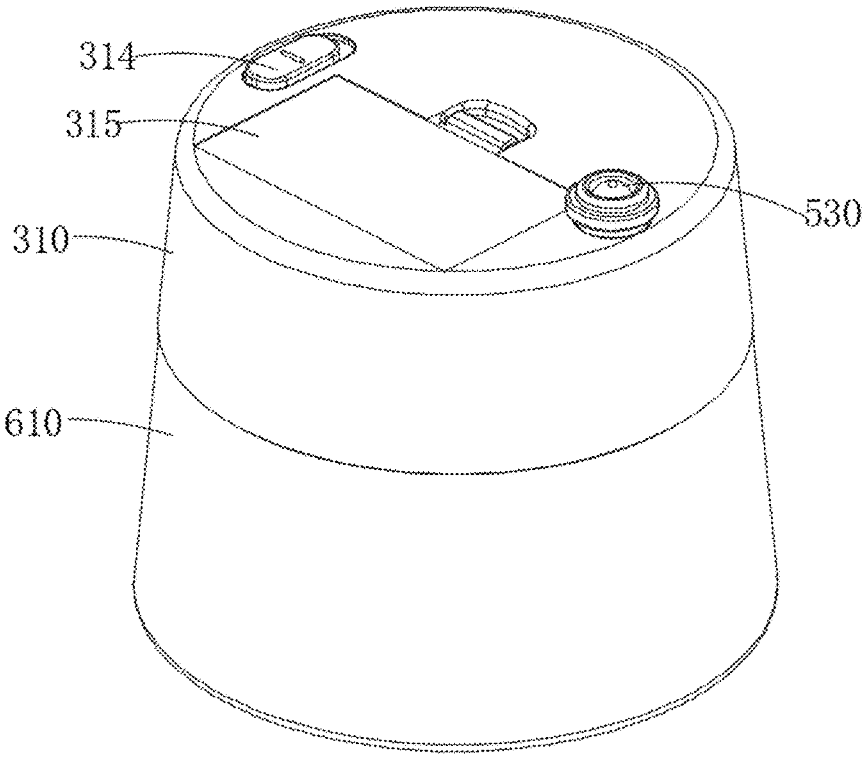
FIG. 9 is a perspective view of a Mason jar sealing device according to an embodiment 2 of the present disclosure.

As shown in FIG. 8, the mounting cover 310 includes the first end wall 311 and the first side wall 312 that is extending downwardly from the first end wall 311. The first end wall 311 and the first side wall 312 cooperatively form the receiving cavity 318 having the opening at the bottom thereof. The partition plate 320 is connected to the first end wall 311 and is disposed opposite to the first end wall 311. The air inlet 40 is defined in the first side wall 312. The configuration allows the air inlet 40 to be located on a side of the mounting cover 310, saving a space of a top of the device and enabling the device to be more compact in structure.

Further, the first end wall 311 defines a battery compartment 313 and is arranged with a control switch 314. A battery is received in the battery compartment 313 and is configured to supply power to the vacuum pump 510. The control switch 314 is configured to control a circuit of the vacuum pump 510 to be conducted or disconnected.

Specifically, the mounting cover 310 also includes a compartment cover 315 configured to cover the battery compartment 313 to protect the battery. The vacuum pump 510 may be quickly controlled by the control switch 314, such that the user may operate and use the vacuum pump 510 easily.

Figure 7:
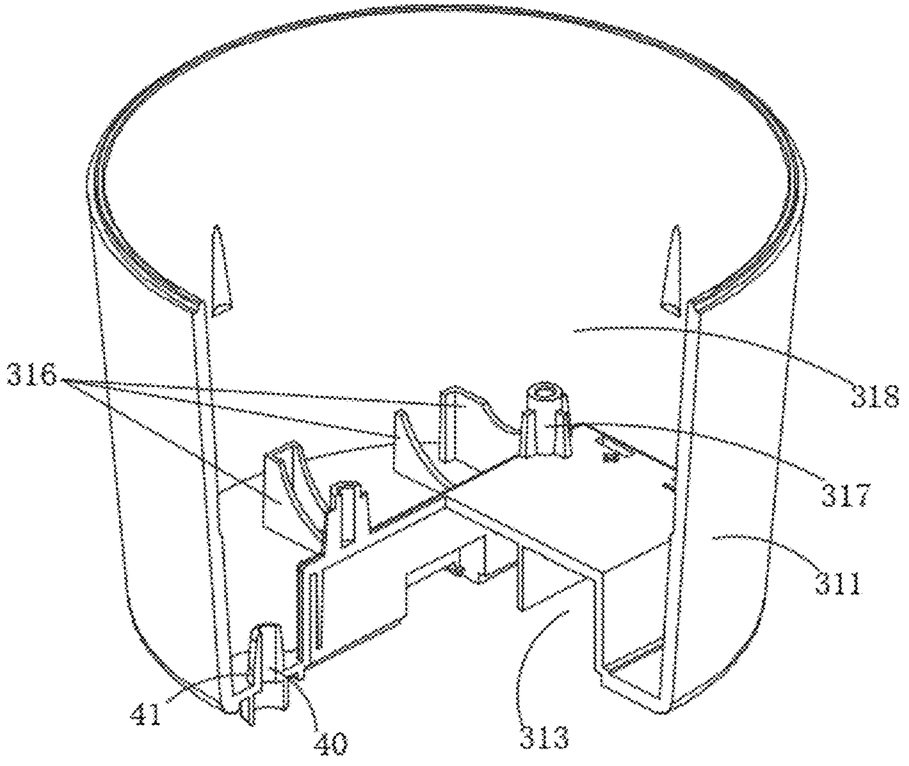
FIG. 7 is a cross-sectional view of the mounting cover of the Mason jar sealing device according to the embodiment 1 of the present disclosure.

As shown in FIGS. 4 and 7, the vacuum pump 510 is mounted on the first end wall 311, and the vent hole 321 is located near or at a center of the partition plate 320. A distance between the vent hole 321 at the center and one wall of the sealing cavity 70 is substantially the same as a distance between the vent hole 321 at the center and any other wall of the sealing cavity 70. On the one hand, the vacuum pump 510 is facilitated to extract the air through the vent hole 321, improving an operation efficiency of the vacuum pump 510. On the other hand, a localized stress concentration of the partition plate 320 is reduced, a risk that the partition plate 320 is damaged due to uneven stress is reduced.

Specifically, the first end wall 311 is arranged with a plurality of mounting tabs 316. The vacuum pump 510 is secured to the mounting tabs 316 by screws. A gap is defined between adjacent mounting tabs 316 of the plurality of mounting tabs 316. The gap increases a contact area between the vacuum pump 510 and the air in the receiving cavity 318, such that heat of the vacuum pump 510 may be dissipated easily when the vacuum pump 510 is operating, ensuring the operation efficiency of the vacuum pump 510.

Figure 6:
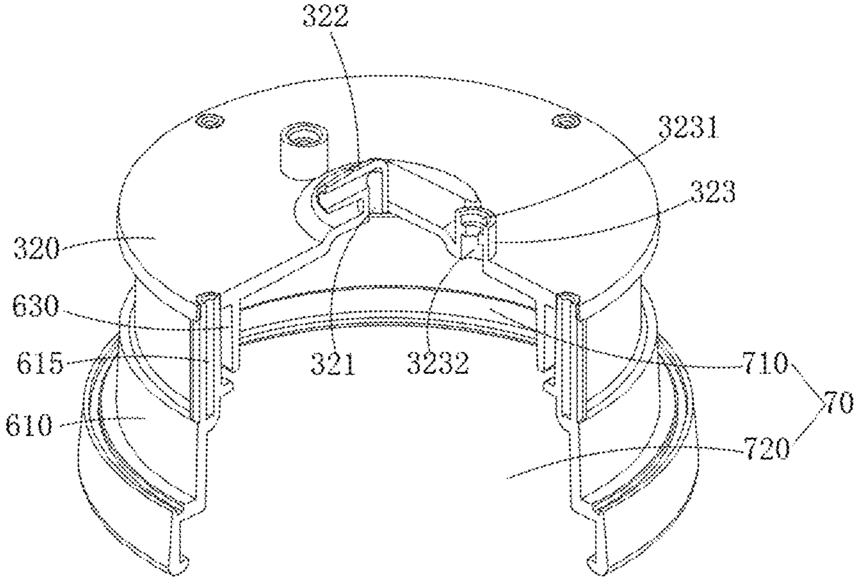
FIG. 6 is a cross-sectional view of the partition plate and a connection shell of the Mason jar sealing device according to the embodiment 1 of the present disclosure.

As shown in FIGS. 5 and 6, the first end wall 311 is arranged with a positioning protrusion 317, and the partition plate 320 is arranged with a connection protrusion 323. The connection protrusion 323 is connected to the positioning protrusion 317 by a screw.

Specifically, an end of the connection protrusion 323 defines a positioning slot 3231, and the other end of the connection protrusion 323 is arranged with a counterbore hole 3232. The positioning slot 3231 is communicated with the counterbore hole 3232. The positioning slot 3231 is disposed at an end near the first end wall 311. The positioning protrusion 317 is arranged with internal threads. Therefore, when assembling the partition plate 320 and the first end wall 311, the positioning protrusion 317 is mated with the positioning slot 3231 firstly, and subsequently, the screw extends through the counterbore hole 3232 to be threaded to the positioning protrusion 317. In the present embodiment, two connection protrusions 323 are symmetrically disposed on the partition plate 320, and two positioning protrusions 317 are symmetrically disposed on the first end wall 311. The two connection protrusions 323 are mated with the two positioning protrusions 317 respectively, such that the partition plate 320 is mounted on the first end wall 311 more stably. In addition, a sealing block 326 is arranged at an opening of the counterbore hole 3232 to improve airtightness of the partition plate 320 and to prevent the gap between the screw and the counterbore hole 3232 from affecting the sealing performance of the Mason jar body 10.

Further, the connection assembly 60 includes a connection shell 610 and a first loop 620. The connection housing 610 is mounted on the partition plate 320 or the mounting shell 30. In the present embodiment, in order to facilitate mounting the connection shell 610, the connection shell 610 is connected to the horizontal partition plate 320, i.e., the connection shell 610 is connected to a side of the partition plate 320 away from the air pumping-inputting assembly 50. The first sealing loop 620 is mounted on the connection shell 610. When the device is in use, the first sealing loop 620 abuts against an outer wall of the Mason jar body 10, such that the first sealing loop 620 and the partition plate 320 cooperatively define the sealing cavity 70.

Specifically, an end of the first sealing loop 620 abutting against the Mason jar body 10 is arc shaped. The arc shape increases a contact area between the first sealing loop 620 and the Mason jar body 10, improving the airtightness of the Mason jar body 10. When the Mason jar body 10 is sealed, the Mason jar body 10 is extended into the sealing cavity 70 in the connection shell 610. The vacuum pump 510 is activated to extract the air out of the sealing cavity 70, reducing the pressure in the sealing cavity 70. In this way, the first sealing loop 620 is attached to the Mason jar body 10, achieving sealing of the Mason jar body 10. When the sealing member 530 is separated from the air inlet pipe 41, the air out of the Mason jar flows into the sealing cavity 70, such that the pressure in the sealing loop is balanced with the atmospheric pressure, enabling the first sealing loop 620 to be separated from the Mason jar body 10, and facilitating the Mason jar body 10 to be taken out from the connection shell 610.

To be noted that, the air inlet 40 may be defined in the connection shell 610. The air inlet 40 is directly communicated with the sealing cavity 70, and the vacuum pump 510 is directly communicated with the air delivery tube 322 via the flexible air tube 540. In this way, the three-way connector 520 does not need to connect to various ports, saving manufacturing costs. When the vacuum pump 520 is operating, the air in the sealing cavity 70 is discharged to the receiving cavity 318 by flowing through the air delivery tube 322, the flexible air tube 540, and the vacuum pump 520 successively, achieving the sealing of the Mason jar body 10. Subsequently, the sealing member 530 is separated from the air inlet 40, such that the air in the outside of the jar flows into the sealing cavity 70 through the connection shell 610, thereby releasing the sealing of the Mason jar body 10 by the first sealing ring 620, and in this way, the Mason jar body 10 can be removed from the connection shell 610.

As shown in FIGS. 1-8, the embodiment 1 of the present disclosure is shown. The sealing cavity 70 extends through the top of the connection shell 610, such that the connection shell 610 is tubular. The top of the connection shell 610 is connected to the partition plate 320 in a sealing manner. The connection assembly 60 further includes a sealing ring 630, received in the sealing cavity 70. The sealing ring 630 is connected to the bottom of the partition plate 320. In the present embodiment, the sealing ring 630 and the partition plate 320 are configured as a one-piece and integral structure, ensuring airtightness between the partition plate 320 and the sealing ring 630. A mounting gap is formed between the sealing ring 630 and an inner wall of the connection shell 610. An end of the first sealing loop 620 is received in the mounting gap, and the other end of the first sealing loop 620 abuts against the outer wall of the Mason jar body 10.

Specifically, the partition plate 320 defines a mounting hole 325. The connection shell 610 is arranged with a threaded hole 615. A screw extends through the mounting hole 325 to be connected to the threaded hole 615 to enable the partition plate 320 to be connected and fixed to the connection shell 610. Taking the screw to connect the partition plate 320 with the connection shell 610 allows the structure to be more precise, vibration or impacts, which are generated by the operation of the vacuum pump 510 to cause components to be loosened or displaced, may be reduced, such that reliability of the device is improved.

When the Mason jar body 10 is extended into the connection shell 610, both the jar lid 20 and the opening of the Mason jar body 10 are located inside the sealing ring 630. The sealing ring 630 has a certain rigidity. On the one hand, the rigidity facilitates mounting of the first sealing loop 620, allowing the first sealing loop 620 to be attached to the Mason jar body 10. On the other hand, a position of the jar lid 20 is fixed, preventing the jar lid 20 from deflecting when being attached to the Mason jar body 10.

As shown in FIGS. 9-16, an example 2 of the device is shown. The connection shell 610 includes a second end wall 611 and a second side wall 612 that is extending downwardly from the second end wall 611. The second end wall 611 is connected to the partition plate 320. The second end wall 611 defines an airflow hole 613. The airflow hole 613 is communicated with the vent hole 321. The connection assembly 60 further includes the sealing ring 630. The sealing ring 630 is arranged on the second end wall 611. In the present embodiment, the sealing ring 630 and the second end wall 611 are configured as a one-piece and integral structure to ensure airtightness therebetween. A mounting gap is formed between the sealing ring 630 and the second side wall 612. An end of the first sealing loop 620 is received in the mounting gap, and the other end of the first sealing loop 620 abuts against the outer wall of the Mason jar body 10

Figure 14:
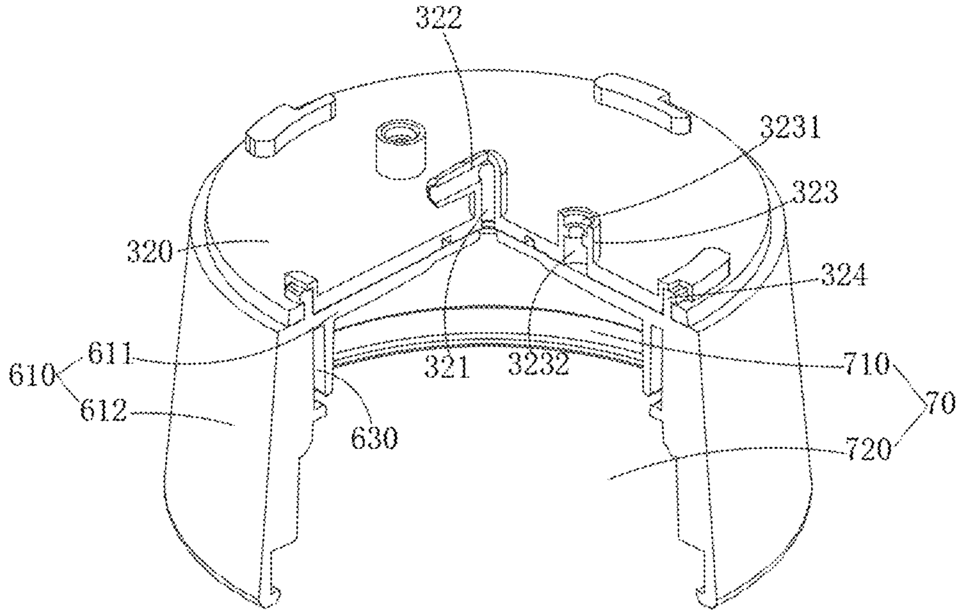
FIG. 14 is a cross-sectional view of the partition plate and a connection shell of the Mason jar sealing device according to the embodiment 2 of the present disclosure.
Figure 15:
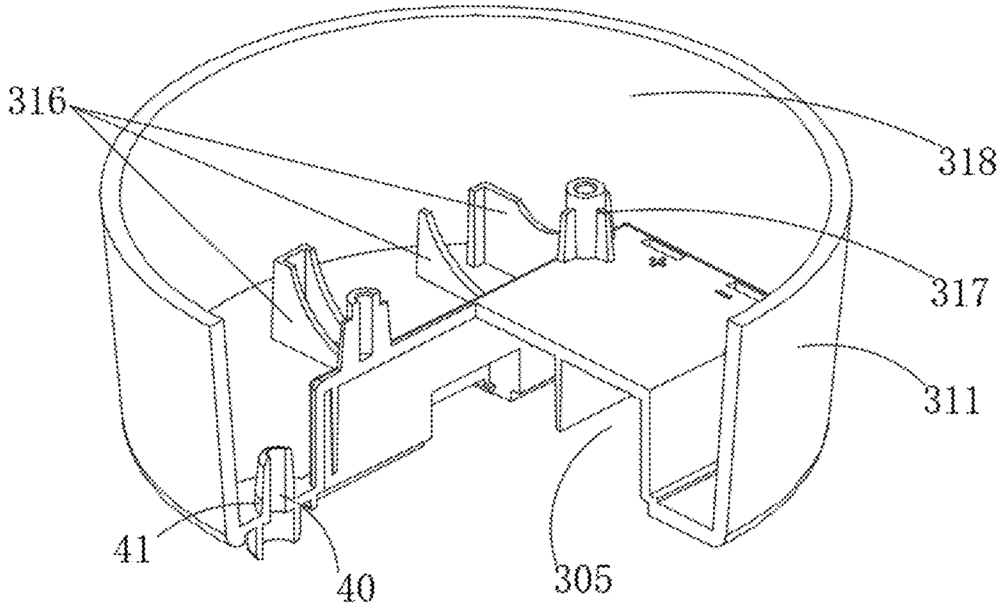
FIG. 15 is a structural schematic view of the connection shell of the Mason jar sealing device according to the embodiment 2 of the present disclosure.
Figure 16:
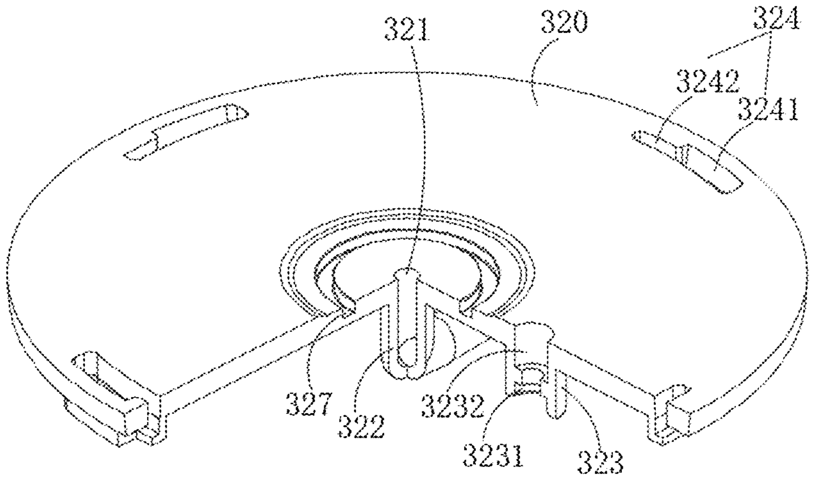
FIG. 16 is a structural schematic view of the partition plate of the Mason jar sealing device according to the embodiment 2 of the present disclosure.

As shown in FIGS. 14-16, the partition plate 320 defines a snap-in slot 324. The second end wall 611 is arranged with a snapping protrusion 614 that is mated with the snap-in slot 324. Mating between the snapping protrusion 614 and the snap-in slot 324 may be rotation snapping, straightforward insertion snapping, locking snapping, and so on. In the present embodiment, the rotation snapping is applied.

Specifically, as shown in FIG. 16, the snap-in slot 324 includes an insertion portion 3241 and a snapping portion 3242 communicated with the insertion portion 3241. The snapping protrusion 614 is L-shaped. The snapping portion 3242 is L-shaped. The snapping protrusion 614 snaps to the snapping portion 3242 via the insertion portion 3241. When assembling, the snapping protrusion 614 is firstly inserted into the insertion portion 3241, and subsequently, the second side wall 612 is rotated to enable the snapping projection 614 to slide from the insertion portion 3241 into the snapping portion 3242 to be mated with the snapping portion 3242. In this way, connection between the connection shell 610 and the partition plate 320 is achieved. The snapping manner facilitates the connection shell 610 to be disassembled, and the user may clean and replace the first sealing loop 620 easily.

Figure 10:
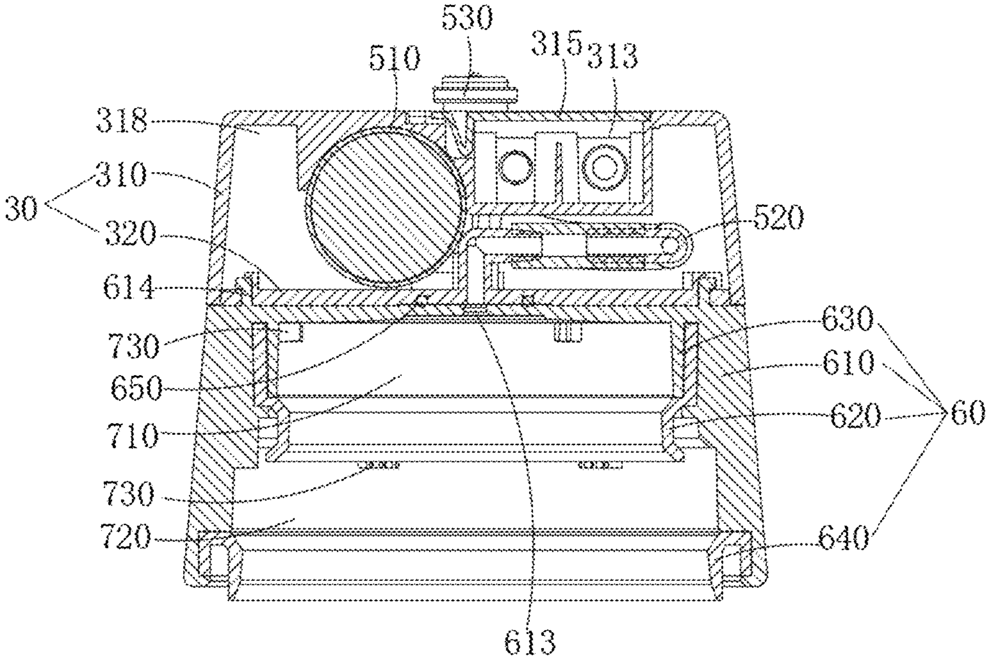
FIG. 10 is a cross-sectional view of the Mason jar sealing device shown in FIG. 1.
Figure 11:
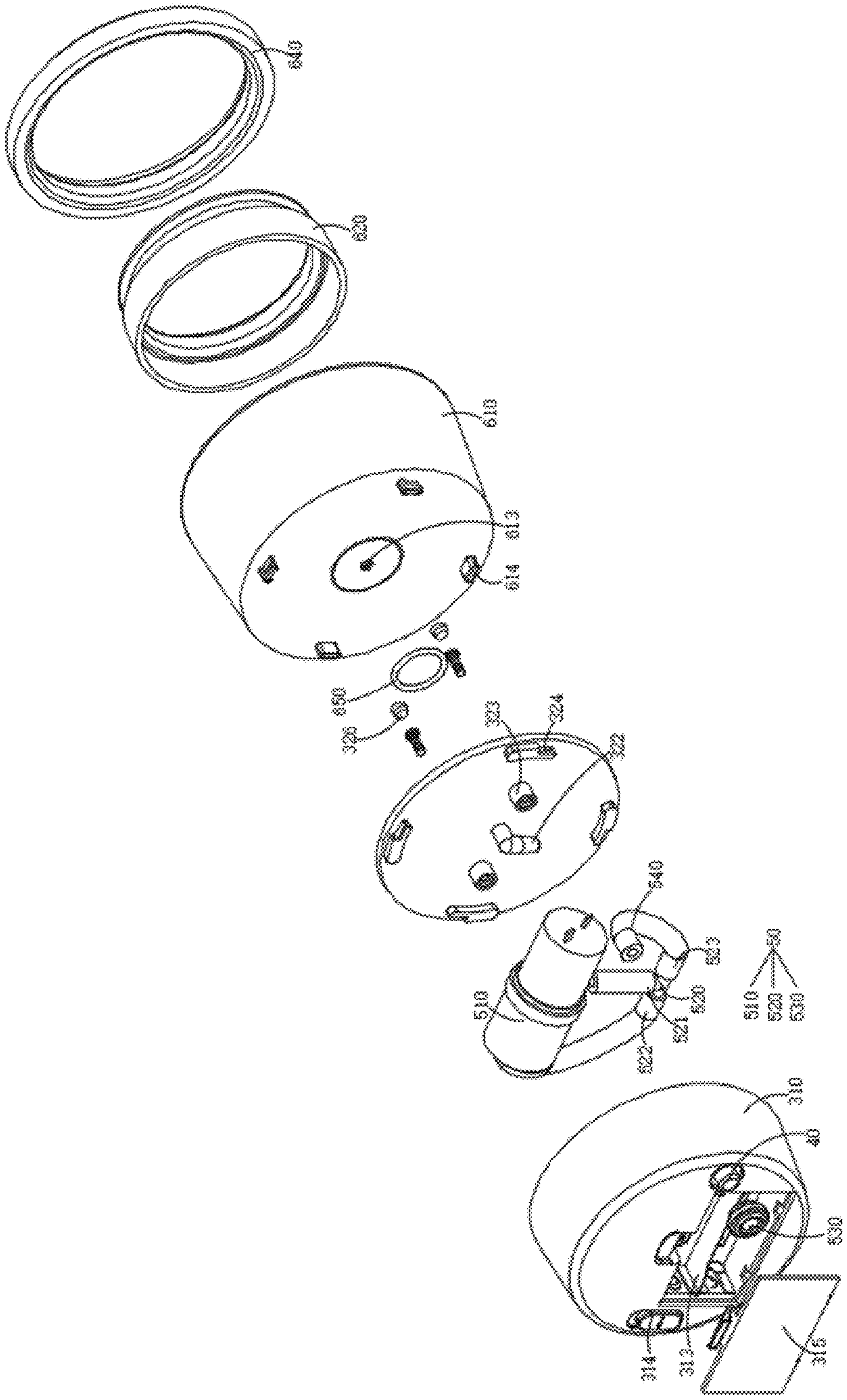
FIG. 11 is an exploded view of the Mason jar sealing device according to the embodiment 2 of the present disclosure.
Figure 12:
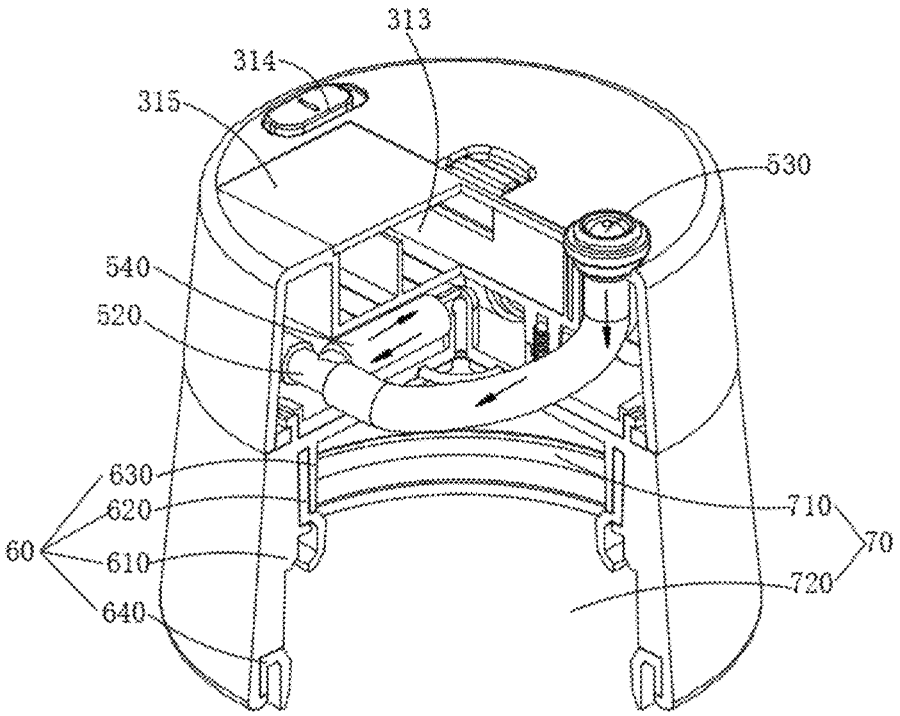
FIG. 12 is a cross-sectional view of partial components of the Mason jar sealing device according to the embodiment 2 of the present disclosure.
Figure 13:
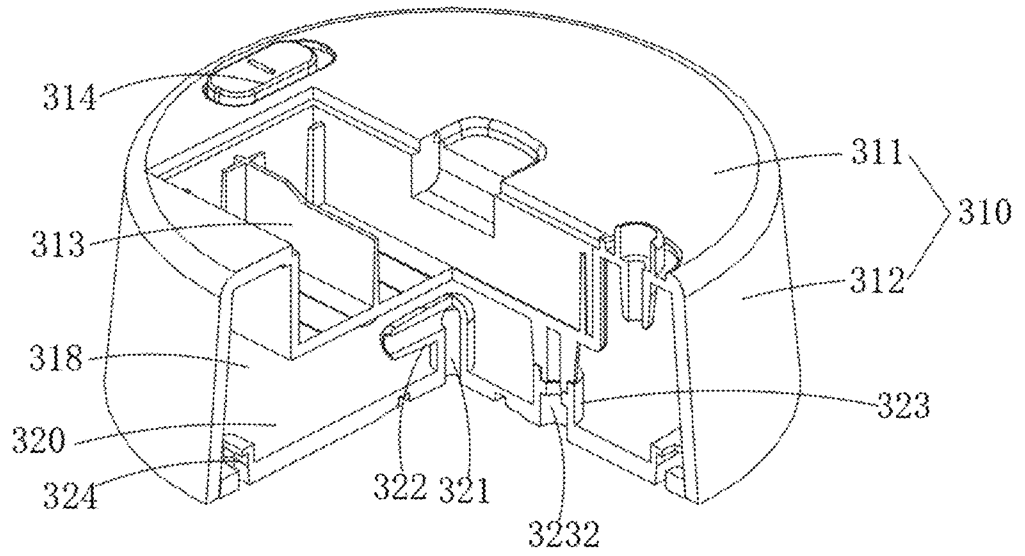
FIG. 13 is a cross-sectional view of a mounting cover and a partition plate of the Mason jar sealing device according to the embodiment 2 of the present disclosure.

As shown in FIG. 10, a third sealing loop 650 is disposed between the partition plate 320 and the second end wall 611.

Specifically, a lower portion of the partition plate 320 defines a receiving slot 327. The third sealing loop 650 is mounted in the receiving slot 327. When the partition plate 320 is snapped with the second end wall 611, the third sealing loop 650 abuts against the second end wall 611. By arranging the third sealing loop 650, the airtightness between the partition plate 320 and the second end wall 611 is improved, such that when the partition plate 320 is snapped with the second end wall 611, the vacuum pump 510 may extract the air.

Further, the sealing cavity 70 includes a first cavity 710 and a second cavity 720 communicated with the first cavity 710. The first cavity 710 is located above the second cavity 720. A radius of the first cavity 710 is smaller than a radius of the second cavity 720. In this way, an interior of the connection shell 610 is stepped. The first sealing loop 620 surrounds the first cavity 710. The connection assembly 60 further includes a second sealing loop 640. A radius of the second sealing loop 640 is greater than a radius of the first sealing loop 620. The second sealing loop 640 surrounds the second cavity 720. The second sealing loop 640 abuts against the outer wall of the Mason jar body 10. Specifically, a cross section of the second sealing loop 640 is U-shaped. Configuring the second sealing loop 640 to be U-shaped increases a contact area between the Mason jar body 10 and the second sealing loop 640, facilitating the second sealing loop 640 to be attached to the Mason jar body 10.

The Mason jar body 10 is configured with an opening having a standard opening size and another opening having a wider opening size. The first cavity 710 is adapted to the Mason jar body 10 having the standard opening size. The second chamber 720 is adapted to the Mason jar body 10 having the wider opening size. When the Mason jar body 10 having the wider opening size is being sealed, the jar lid 20 is placed at the opening of the Mason jar body 10, the Mason jar body 10 is extended into the connection shell 610, the jar lid 20 and the opening of the jar body are located in the second cavity 720. Subsequently, the vacuum pump 510 is activated to pump the air in the second cavity 720 to flow through the first cavity 710, the airflow hole 613, the vent hole 321, the first hole 521, the second hole 522, and the vacuum pump 510 successively to reach the receiving cavity 318. The pressure inside the second cavity 720 is reduced, and the second sealing cavity 70 is attached to the Mason jar body 10. In this way, the jar lid 20 seals the opening of the Mason jar body 10. By dividing the sealing cavity 70 into the first chamber 710 and the second cavity 720, the sealing device is used to seal the Mason jar body 10 of two opening sizes, improving the practicability of the sealing device.

As shown in FIG. 10, a plurality of abutting portions 730 are arranged in the sealing cavity 70, the plurality of abutting portions 730 are configured to abut against the jar lid 20.

In the present embodiment, the abutting portions 730 are arranged on the inner wall of the first cavity 710 and on the inner wall of the second cavity 720. Regardless of which opening size of the Mason jar body 10 is to be sealed, at least some of the plurality of the abutting portions 730 abut against the jar lid 20 to prevent deflection of the jar lid 20 and to ensure accurate attachment between the jar lid 20 and the opening of the Mason jar body 10.

Obviously, the above embodiments show only some of, not all of, the embodiments of the present disclosure. The accompanying drawings provide preferred embodiments of the present disclosure, but do not limit the patent scope of the present disclosure. The present disclosure may be achieved in various forms. These embodiments are provided for the purpose of understanding the present disclosure more thoroughly and comprehensively. Although the present disclosure is described in detail by referring to the above embodiments, any ordinary skilled person in the art may modify the technical solutions in the embodiments or make equivalent substitutions for some of the technical features therein. Any equivalent structure obtained based on the specification and the drawings of the present disclosure, applied directly or indirectly in other related technical fields, shall be equivalently included in the scope of the present disclosure.

What is claimed is:

1. A Mason jar sealing device, configured to seal a jar lid to an opening of a Mason jar body, the Mason jar sealing device comprising: a mounting shell, a connection assembly, and an air pumping-inputting assembly;

wherein, the mounting shell or the connection assembly defines an air inlet;

an end of the connection assembly is connected to the mounting shell, and the other end of the connection assembly is configured to be connected to the Mason jar body; when in use, a sealing cavity is formed between the connection assembly and the Mason jar body, and the opening of the Mason jar body is located in the sealing cavity;

the air pumping-inputting assembly is mounted on the mounting shell, the air pumping-inputting assembly is communicated with the air inlet and the sealing cavity, the air pumping-inputting assembly is configured to extract air out of the Mason jar body to enable the jar lid to seal to the Mason jar body and to selectively open or close the air inlet;

wherein, the air pumping-inputting assembly comprises a vacuum pump, a three-way connector, and a sealing member;

the vacuum pump is mounted in a receiving cavity of the mounting shell;

the three-way connector is mounted in the receiving cavity and comprises a first hole, a second hole, and a third hole; the first hole, the second hole and the third hole are communicated with each other; the first hole is communicated with the sealing cavity, the second hole is communicated with the vacuum pump, and the third hole is communicated with the air inlet;

the sealing member is mounted at the air inlet and is configured to seal or open the air inlet.

2. The Mason jar sealing device according to claim 1, wherein, the mounting shell comprises a mounting cover and a partition plate;

the receiving cavity has an opening on a side;

the partition plate covers the opening of the receiving cavity, the partition plate defines a vent hole that is communicated with the sealing cavity;

the air pumping-inputting assembly is received in the receiving cavity and is communicated with the air inlet and vent hole.

3. The Mason jar sealing device according to claim 2, wherein, the first hole is communicated with the vent hole.

4. The Mason jar sealing device according to claim 3, wherein, the first hole is communicated with the vent hole via a flexible air tube, the second hole is communicated with the vacuum pump via the flexible air tube, and the third hole is communicated with the air inlet via the flexible air tube.

5. The Mason jar sealing device according to claim 3, wherein, the mounting cover comprises a first end wall and a first side wall that is extending downwardly from the first end wall, the first end wall and the first side wall cooperatively define a receiving cavity having an opening facing away from the first end wall;

the partition plate is connected to the first end wall and is disposed opposite to the first end wall, the air inlet is defined in the first end wall.

6. The Mason jar sealing device according to claim 5, wherein, the vacuum pump is mounted on the first end wall, and the vent hole is disposed near or at a center of the partition plate.

7. The Mason jar sealing device according to claim 6, wherein, the first end wall is arranged with a number of mounting tabs, and the vacuum pump is fixed to the mounting tabs by screws.

8. The Mason jar sealing device according to claim 5, wherein, the first end wall is arranged with a battery compartment and a control switch, the battery compartment is configured to receive a battery, the battery is configured to supply power to the vacuum pump, and the control switch is configured to control a circuit of the vacuum pump to be conducted or disconnected.

9. The Mason jar sealing device according to claim 5, wherein, the first end wall is arranged with a positioning protrusion, the partition plate is arranged with a connection protrusion, the connection protrusion is screwed to the positioning protrusion.

10. The Mason jar sealing device according to claim 3, wherein, the mounting cover comprises a first end wall and a first side wall that is extending downwardly from the first end wall, the first end wall and the first side wall cooperatively define a receiving cavity having an opening facing away from the first end wall;

the partition plate is connected to the first end wall and is disposed opposite to the first end wall, the air inlet is defined in the first side wall.

11. A Mason jar sealing device, configured to seal a jar lid to an opening of a Mason jar body, the Mason jar sealing device comprising: a mounting shell, a connection assembly, and an air pumping-inputting assembly;

wherein, the mounting shell or the connection assembly defines an air inlet;

an end of the connection assembly is connected to the mounting shell, and the other end of the connection assembly is configured to be connected to the Mason jar body:

the air pumping-inputting assembly is mounted on the mounting shell, the air pumping-inputting assembly is communicated with the air inlet, the air pumping-inputting assembly is configured to extract air out of the Mason jar body to enable the jar lid to seal to the Mason jar body and to selectively open or close the air inlet;

wherein, the connection assembly comprises a connection shell, a first sealing loop, and a second sealing loop;

the connection shell is mounted on a partition plate or a mounting cover of the mounting shell;

the first sealing loop and the second sealing loop are mounted on the connection shell;

when the sealing device is in use, a first side wall of the first sealing loop abuts against an outer wall of the Mason jar body and is spaced apart from the connection shell; or when the sealing device is in use, a second side wall of the second sealing loop abuts against an outer wall of the Mason jar body and is spaced apart from the connection shell.

12. The Mason jar sealing device according to claim 11, wherein, a top of the connection shell is connected to the partition plate in a sealing manner;

the connection assembly further comprises a sealing ring, the sealing ring is connected to the bottom of the partition plate; a mounting gap is defined between the sealing ring and an inner wall of the connection shell; an end of the first sealing loop is received in the mounting gap, and the other end of the first sealing loop abuts against the outer wall of the Mason jar body.

13. The Mason jar sealing device according to claim 11, wherein, the connection shell comprises a second end wall and a second side wall that is extending downwardly from the second end wall, the second end wall is connected to the partition plate, the second end wall defines an airflow hole, the airflow hole is communicated with the vent hole;

the connection assembly further comprises a sealing ring, the sealing ring is arranged on the second end wall, a mounting gap is defined between the sealing ring and the second side wall, an end of the first sealing loop is received in the mounting gap, and the other end of the first sealing loop abuts against the outer wall of the Mason jar body.

14. The Mason jar sealing device according to claim 13, wherein, the partition plate defines a snap-in slot, and the second end wall is arranged with a snapping protrusion that is mated with the snap-in slot.

15. The Mason jar sealing device according to claim 14, wherein, the snap-in slot comprises an insertion portion and a snapping portion communicated with the insertion portion, the snapping protrusion is L-shaped, the snapping portion is L-shaped, the snapping protrusion is snapped to the snapping portion via the insertion portion.

16. The Mason jar sealing device according to claim 14, wherein, the sealing cavity comprises a first cavity and a second cavity communicated with the first cavity, the first cavity is located above the second cavity, a radius of the first cavity is smaller than a radius of the second cavity;

the first sealing loop surrounds the first cavity;

a radius of the second sealing loop is greater than a radius of the first sealing loop, the second sealing loop surrounds the second cavity.

17. The Mason jar sealing device according to claim 16, wherein, a plurality of abutting portions are arranged inside the sealing cavity, the plurality of abutting portions are configured to abut against the jar lid.

18. The Mason jar sealing device according to claim 17, wherein, the plurality of abutting portions are disposed on an inner wall of the first cavity and an inner wall of the second cavity.

19. The Mason jar sealing device according to claim 14, wherein, a third sealing loop is disposed between the partition plate and the second end wall.

20. The Mason jar sealing device according to claim 11, wherein, the partition plate is connected to the connection shell through a screw.

* * * * *